United States Patent [19]

Hitomi et al.

[11] Patent Number: 4,671,217
[45] Date of Patent: Jun. 9, 1987

[54] INTAKE SYSTEM FOR INTERNAL COMBUSTION ENGINE

[75] Inventors: Mitsuo Hitomi; Fumio Hinatase; Yasuhiro Yuzuriha, all of Hiroshima, Japan

[73] Assignee: Mazda Motor Corporation, Japan

[21] Appl. No.: 795,987

[22] Filed: Nov. 7, 1985

[30] Foreign Application Priority Data

Nov. 9, 1984 [JP] Japan .................. 59-237041

[51] Int. Cl.⁴ .............................. F02B 27/00
[52] U.S. Cl. .............................. 123/52 MB
[58] Field of Search .............. 123/52 M, 52 MB, 308, 123/432

[56] References Cited

U.S. PATENT DOCUMENTS

| | | | |
|---|---|---|---|
| 2,862,490 | 12/1958 | Trisler | 123/52 MB |
| 3,814,069 | 6/1974 | Croft et al. | 123/52 M |
| 4,445,480 | 5/1984 | Inoue et al. | 123/308 |
| 4,565,166 | 1/1986 | Takeda | 123/52 M |
| 4,574,748 | 3/1986 | Inoue et al. | 123/52 MB |

FOREIGN PATENT DOCUMENTS 115819   9/1981 Japan .
57-110765 6/1982 Japan .

OTHER PUBLICATIONS

Patent Abstracts of Japan, vol. 6, No. 204, (M-164), [1082], Oct. 15, 1982.

Primary Examiner—Craig R. Feinberg
Attorney, Agent, or Firm—Gerald J. Ferguson, Jr.; Michael P. Hoffman; Ronni S. Malamud

[57] ABSTRACT

An intake system for a multicylinder internal combustion engine comprises an intake passage including a common passage portion opening to the atmosphere, first and second volume chambers communicated with each other by a communicating passage, and a plurality of discrete passage portions branching from the first volume chamber and respectively connected to the cylinders. The second volume chamber is arranged to communicate the discrete passage portions with each other at a portion downstream of the first volume chamber and the common passage portion is communicated to one of the first and second volume chambers. An on-off valve is disposed at each junction of the second volume chamber with the discrete passage portions to move between an open position and a closed position in which the effective cross-sectional area of the junction is narrowed to an extent sufficient to prevent reflection of the pressure wave generated in the discrete passage portion at the second volume chamber. The on-off valves are moved to the open position as the engine speed increases at least during heavy load operation of the engine.

12 Claims, 8 Drawing Figures

1

INTAKE SYSTEM FOR INTERNAL COMBUSTION ENGINE

BACKGROUND OF THE INVENTION

1. Field of the Invention

This invention relates to an intake system for an internal combustion engine, and more particularly to an intake system for an internal combustion engine in which the engine output power is improved by the kinetic effect of intake air.

2. Description of the Prior Art

As is well known, a negative pressure wave generated in an intake system of an internal combustion engine upon initiation of each intake stroke is propagated upstream of the intake system and is then reflected at an end of the system opening to the atmosphere or to a surge tank disposed on the upstream side of the intake system toward the intake port as a positive pressure wave. By arranging the intake system so that the positive pressure wave reaches the intake port immediately before closure of the intake valve to force intake air into the combustion chamber, the volumetric efficiency can be improved. There have been known various intake systems in which such inertia effect or resonance effect of intake air is used for improving the volumetric efficiency. However, the period of vibration of the pressure wave in the intake passage can be matched with the period of opening and closure of the intake valve to obtain a sufficient inertia effect of the intake air only within a limited engine speed range which depends upon the shape of the intake passage. There has been proposed an intake system in which, for instance, the length of the intake passage is changed according to the engine speed in order to obtain the inertia effect of intake air over a wider engine speed range. For example, in the intake system disclosed in Japanese Utility Model Publication No. 58(1983)-56328 or Japanese Unexamined Patent Publication No. 56(1981)-115819, each of the discrete intake passage portions leading to the respective combustion chambers is bifurcated to form a long passage portion and a short passage portion both opening to a surge tank or the like at the upstream end, and an on-off valve is provided in the short passage portion to open the short passage portion in a high engine speed range to shorten the effective length of the discrete intake passage portion, thereby obtaining a sufficient inertia effect of intake air in the high engine speed range in addition to a low engine speed range.

In the system, the effective length of each discrete passage portion is elongated in the low engine speed range so that the pressure vibration generated in the discrete passage portion contributes to the volumetric efficiency. However, a sufficient effect can be obtained only on the high engine speed side of the low engine speed range.

SUMMARY OF THE INVENTION

In view of the foregoing observations and description, the primary object of the present invention is to provide an intake system for a multicylinder internal combustion engine in which the pressure vibration in the discrete passage portion can be effectively utilized to improve the volumetric efficiency in both the low engine speed range and the high engine speed range, and at the same time, the volumetric efficiency can be especially increased in the low engine speed range.

The intake system of the present invention comprises an intake passage including a common passage portion opening to the atmosphere, first and second volume chambers communicated with each other by a communicating means, and a plurality of discrete passage portions branching from the first volume chamber and respectively connected to the cylinders. The second volume chamber is arranged to communicate the discrete passage portions with each other at a portion downstream of the first volume chamber and the common passage portion is communicated to one of the first and second volume chambers. An on-off valve is disposed at each junction of the second volume chamber with the discrete passage portions to move between an open position and a closed position in which the effective cross-sectional area of the junction is narrowed to an extent sufficient to prevent reflection of the pressure wave generated in the discrete passage portion at the second volume chamber. The on-off valves are moved to the open position as the engine speed increases at least during heavy load operation of the engine.

In a high engine speed range higher than a predetermined engine speed, the intake pressure vibration is generated in a relatively short intake passage including the part of each discrete passage portion downstream of the junction of the discrete passage portion with the second volume chamber since the on-off valves are opened and the second volume chamber is communicated with the discrete passage portions at an intermediate portion thereof, whereby the inertia effect of intake air is enhanced in the high engine speed range. On the other hand, in the low engine speed range lower than the predetermined engine speed, intake air is introduced into each cylinder by way of a relatively long intake passage including the entire discrete passage portions and the intake pressure vibration is generated between the first volume chamber and each cylinder, whereby the inertia effect of intake air is enhanced in the low engine speed range. In a lower engine speed range, there is generated a pressure vibration also in the system between the first and second volume chambers which contributes to improvement in the volumetric efficiency in the lower engine speed range. In the intake system of the present invention, the volumetric efficiency can be thus increased over a wider engine speed range.

BRIEF DESCRIPTION OF THE THE DRAWINGS

FIG. 1 is a schematic cross-sectional view of an internal combustion engine provided with an intake system in accordance with a first embodiment of the present invention, FIG. 2 is a plan view of the engine, FIG. 3 is a cross-sectional view showing the detailed structure of the engine of FIG. 1, FIG. 4 is a schematic cross-sectional view of an internal combustion engine provided with an intake system in accordance with a second embodiment of the present invention, FIG. 5 is a plan view of the engine, FIG. 6 is a schematic plan view for illustrating the principle of operation of the intake system of the first and second embodiments, FIG. 7 is a view for illustrating the effect of the present invention, and FIG. 8 is a schematic cross-sectional view of an internal combustion engine provided with an intake system in accordance with a third embodiment of the present invention.

DESCRIPTION OF THE PREFERRED EMBODIMENTS

Figure 1:
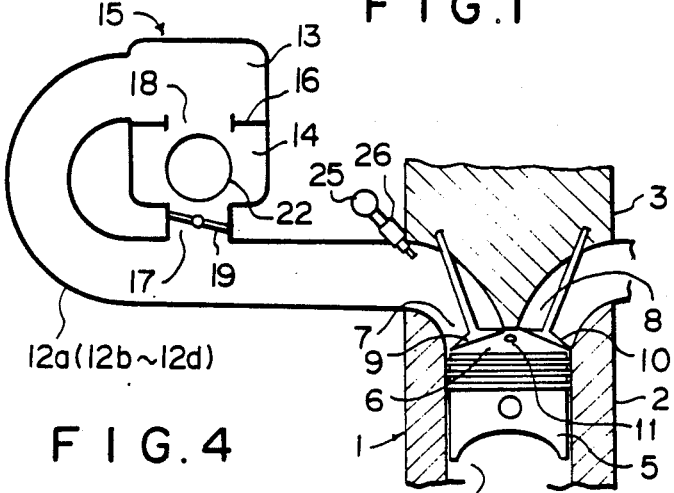
Figure 2:
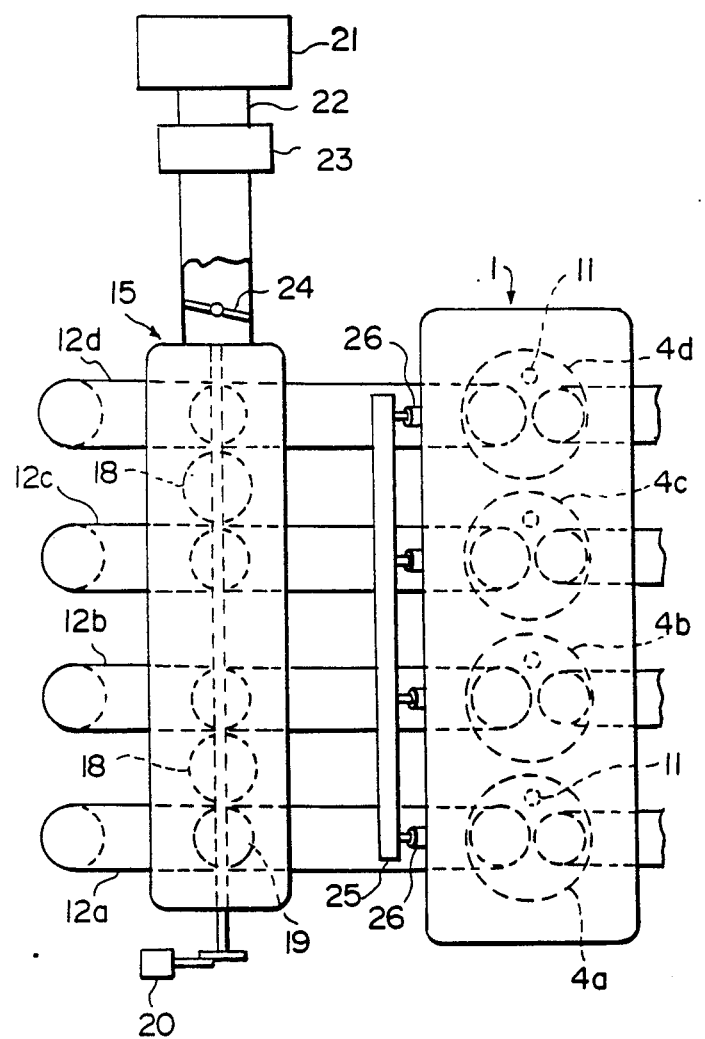
Figure 3:
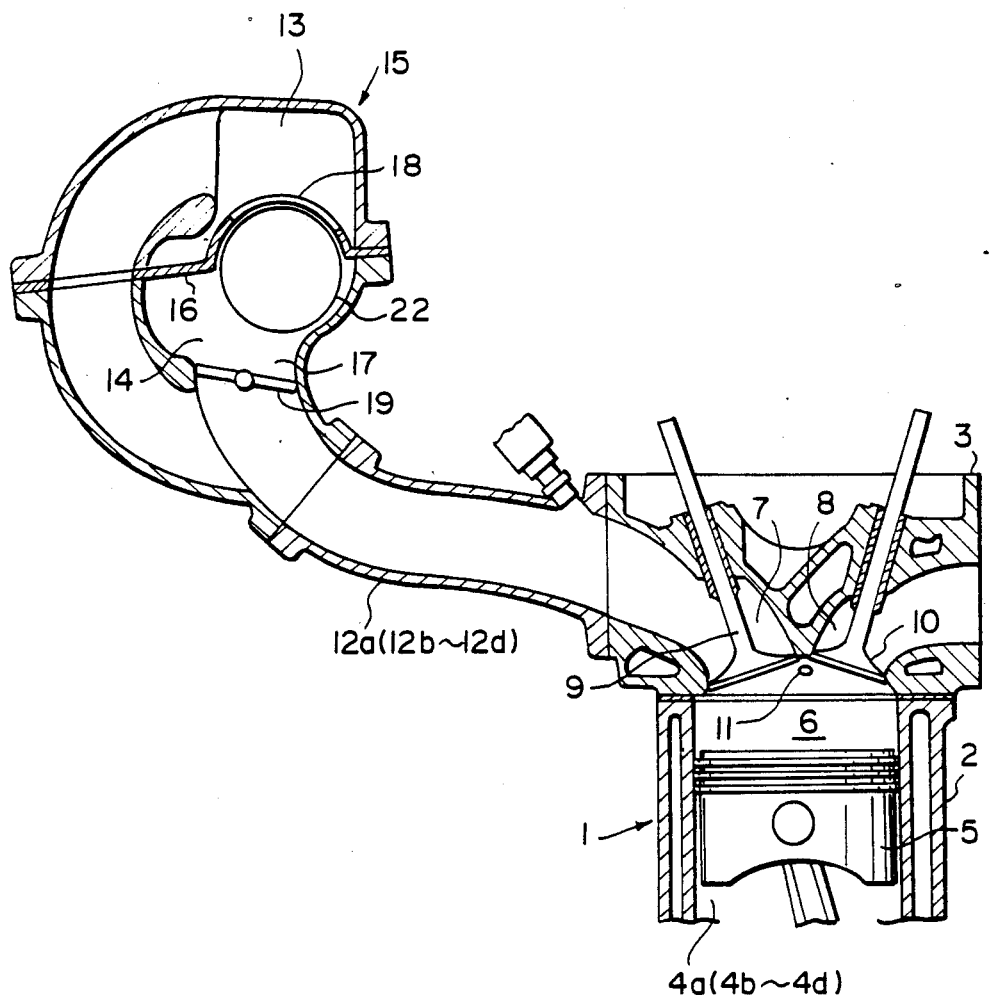

In FIGS. 1, 2 and 3, a four-cylinder four-cycle engine provided with an intake system of the present invention comprises an engine body 1 formed by a cylinder block 2 and a cylinder head 3. First to fourth cylinders 4a to 4d are defined in the engine body 1. In each of the cylinders 4a to 4d, a combustion chamber 6 is defined above a piston 5 received in the cylinder. An intake port 7 and an exhaust port 8 are open to the combustion chamber 6, and an intake valve 9 and an exhaust valve 10 are respectively provided in the intake port 7 and the exhaust port 8. The combustion chamber 6 is further provided with an ignition plug 11.

Intake air is introduced into the combustion chambers 6 through an intake passage including first to fourth discrete passage portions 12a to 12d respectively connected to the first to fourth cylinders 4a to 4d. The upstream ends of the discrete passage portions 12a to 12d are connected to a first volume chamber 13 having a certain volume. A second volume chamber 14 is connected to the discrete passage portions 12a to 12d at intermediate portions thereof by way of communicating openings 17, whereby the discrete passage portions 12a to 12d are mutually communicated. The first volume chamber 13 and the second volume chamber 14 are formed integrally with each other in an enlarged portion 15 formed at an intermediate portion of the intake passage. That is, the internal space of the enlarged portion 15 is divided into an upper space and a lower space by a partition wall 16, the former and the latter respectively forming the first volume chamber 13 and the second volume chamber 14. The communicating openings 17 are formed in the lower wall of the second volume chamber 14. Each discrete passage portion is bent upward and connected to a side of the first volume chamber 13 at its upstream end. This arrangement is advantageous in compactly forming the overall intake system. In the concrete embodiment shown in FIG. 3, the upstream end portions of the discrete passage portions 12a to 12d are formed along the periphery of the enlarged portion 15, and the part of the enlarged portion 15 forming the first volume chamber 13 and the upper part of the upstream end portions of the discrete passage portions 12a to 12d are formed integrally with each other into a unit, and the part of the enlarged portion 15 forming the second volume chamber 14 and the lower part of the upstream end portions of the discrete passage portions 12a to 12d are formed integrally with each other into a unit. The units are connected together with the partition wall 16 intervening therebetween, and the remaining part of each discrete passage portion 12a to 12d is connected to the units.

The first and second volume chambers 13 and 14 are communicated with each other by means other than the discrete passage portions 12a to 12d. In this particular embodiment, the first and second volume chambers 13 and 14 are communicated with each other by a communicating passage 18 formed in the partition wall 16. Each communicating opening 17 is provided with an on-off valve 19 which is driven by an actuator 20 to close the communicating opening 17 in the low engine speed range lower than a predetermined engine speed and to open the same in the high engine speed range not lower than the predetermined engine speed under the control of a control circuit (not shown) which receives an rpm signal from an engine speed detecting means (not shown). Such control of the on-off valves 19 should be accomplished at least during heavy load operation of the engine and they may be kept closed or opened during light load operation of the engine.

A common passage portion 22 is connected to the second volume chamber 14 at the downstream end and opens to the atmosphere at the upstream end by way of an air cleaner 21. An airflow meter 23 is provided in the common passage portion 22 downstream of the air cleaner 21, and a throttle valve 24 is provided in the common passage portion 15 downstream of the airflow meter 23. A fuel injection valve 26 is provided in each discrete passage portion (12a to 12d) near the downstream end thereof and is connected to a fuel supply line 25.

Figure 4:
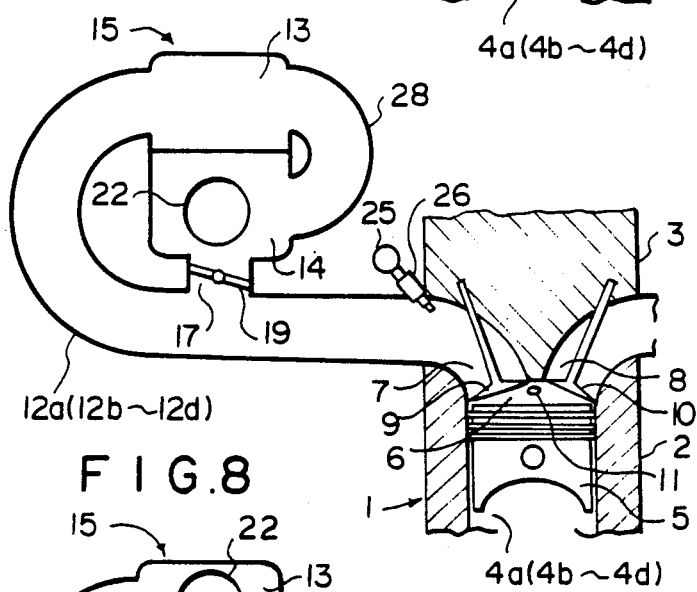
Figure 8:
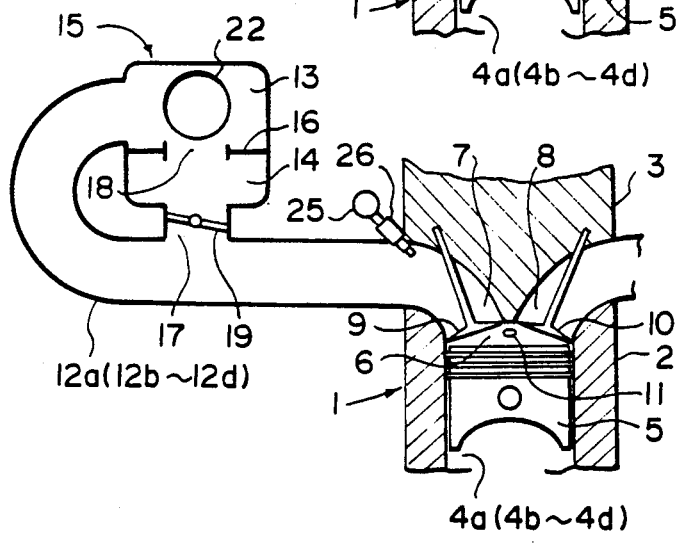
Figure 5:
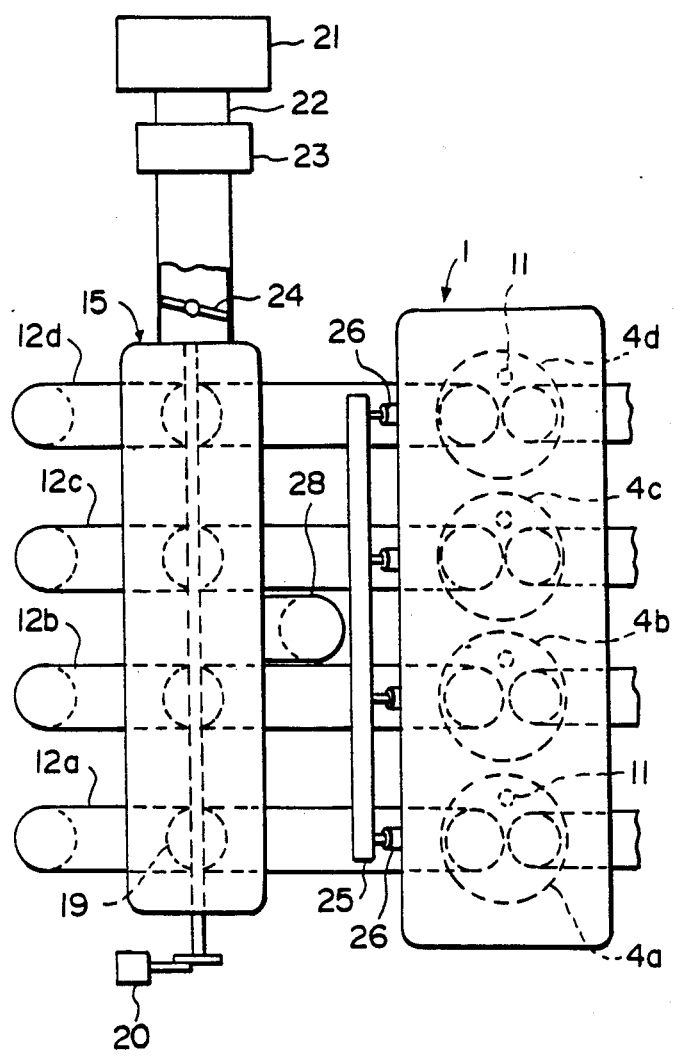

Though in the first embodiment shown in FIGS. 1 to 3, the first and second volume chambers 13 and 14 are communicated by a communicating passage 18 formed in the partition wall 16, they may instead be communicated by a communicating passage 28 which projects outside the enlarged portion 15 and is connected to the first and second volume chambers 13 and 14 at the respective ends as shown in FIGS. 4 and 5.

Figure 6:
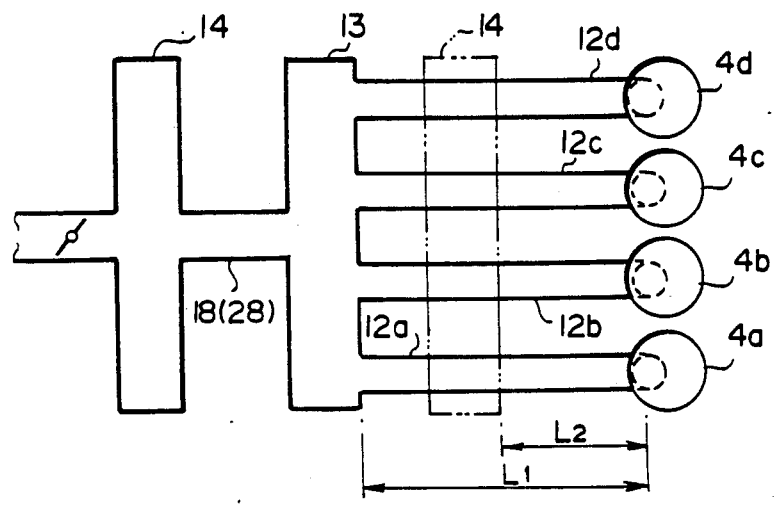

In FIG. 6, the solid lines schematically show an intake system equivalent to the first embodiment shown in FIGS. 1 to 3 and the second embodiment shown in FIGS. 4 and 5 in the state in which the on--off valves 19 are closed. That is, since the communicating openings 17 are closed in this state, the intake system of the first and second embodiment is equivalent to an intake system including the entire discrete passage portions 12a to 12d having a length of L1 and connected to the first volume chamber 13 and the second volume chamber 14 connected to the first volume chamber 13 upstream thereof by way of the communicating passage 18 or the communicating passage 28. Accordingly, the negative pressure wave generated in the intake stroke of each cylinder is propagated to the first volume chamber 13 through the corresponding discrete passage portion and reflected at the first volume chamber 13 toward the cylinder, thereby generating a pressure vibration. When the engine rpm is relatively low, a pressure wave is generated also between the first and second volume chambers due to the pressure wave acting on the first volume chamber 13 from the discrete passage portion and affects the intake pressure vibration. That is, also between the first and second volume chambers 13 and 14, pressure propagation occurs through the communicating passage 18 or 28 having a certain effective length. In this connection, even the communicating passage 18 formed in the partition wall 16 between the first and second volume chambers 13 and 14 can have a certain effective length when opening end correction is taken into account.

Figure 7:
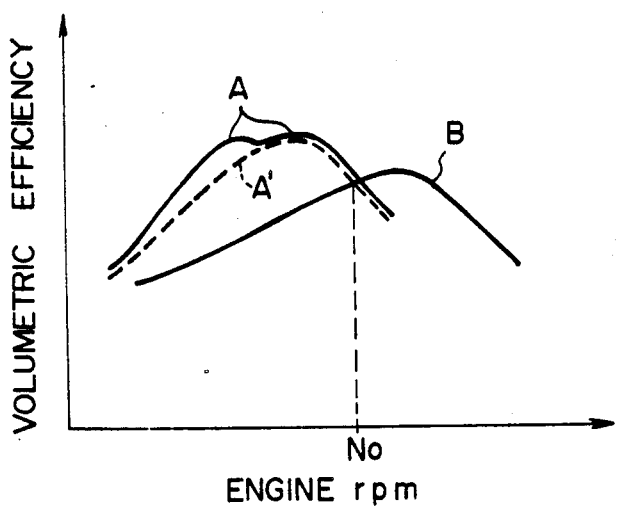

Accordingly, in a low engine speed range in which the period of the natural vibration of the intake system generated in the discrete passage portions 12a to 12d between the cylinders 4a to 4d and the first volume chamber 13 is matched with the period of opening and closure of the intake valves, the pressure acting on each cylinder is enhanced at the end of the intake stroke to increase the volumetric efficiency. In a lower engine speed range, when the natural frequency of the system between the first and second volume chambers 13 and 14 is matched with the frequency of the pressure vibration generated in the first volume chamber 13 due to the intake stroke in each cylinder, the pressure in the first volume chamber 13 is increased and acts on the discrete passage portions 12a to 12d thereby enhance the pressure acting on each cylinder at the end of the intake stroke. As can be understood from the description above, the relation between the engine rpm and the volumetric efficiency during heavy load operation of the engine with the on-off valve 19 being closed is as shown by curve A in FIG. 7. That is, the volumetric efficiency can be increased in the lower engine speed range as compared with an intake system in which the inertia effect of the intake air is enhanced simply by the pressure propagation between a single volume chamber and each cylinder (The relation between the engine rpm and the volumetric efficiency is shown by curve A' in FIG. 7.).

On the other hand, when the on-off valves 19 are opened and the communicating openings 17 are opened, the intake system of the first and second embodiment becomes equivalent to an intake system in which the second volume chamber 14 is located in a position shown by the chained line in FIG. 6 and each cylinder is communicated with the second volume chamber 14 by way of the part of each discrete passage portion downstream of the communicating openings 17 which has a length of L2 shorter than the length L1. Accordingly, the pressure wave is propagated back and forth between the second volume chamber 14 and each cylinder. The period of the intake pressure vibration thus generated is matched with the period of opening and closure of the intake valve in the high engine speed range, thereby increasing the volumetric efficiency. The relation between the engine rpm and the volumetric efficiency during heavy load operation of the engine with the on-off valve 19 open is as shown by curve B in FIG. 7.

By setting said predetermined engine speed at the engine speed No corresponding to the intersection of the curves A and B, that is, by opening the on-off valves 19 when the engine speed is higher than the engine speed No and closing the on-off valves 19 when the engine speed is not higher than the engine speed No, the volumetric efficiency can be improved to improve the engine output over the entire engine speed range.

The third embodiment of the present invention is similar to the first embodiment except that the common passage portion 22 is connected to the first volume chamber 13.

When the on-off valve 19 is closed and the communicating openings 17 are closed, the intake system of this embodiment is equivalent to an intake system including the entire discrete passage portions 12a to 12d connected to the first volume chamber 13 and the second volume chamber 14 connected to the first volume chamber 13 by way of the communicating passage 18. In this case, the intake pressure vibration generated between each cylinder and the first volume chamber 13 is enhanced by the pressure vibration generated between the first and second volume chambers 13 and 14, whereby the volumetric efficiency can be increased in the lower engine speed range. On the other hand, when the on-off valve 19 is opened to communicate the second volume chamber 14 directly with the discrete passage portions 12a to 12d at an intermediate portion, the volumetric efficiency can be increased in the high engine speed range in a manner similar to that described in conjunction with the first and second embodiments. In the third embodiment, means for opening and closing the communicating passage 18 according to the engine speed may be provided.

Though the first and second volume chamber 13 and 14 are formed integrally with each other in the above embodiments, they may be separately formed.

We claim:

1. An intake system for an internal combustion engine having a plurality of cylinders comprising an intake passage including a common passage portion opening to atmosphere, first and second volume chambers freely communicated with each other by a communicating means, and a plurality of discrete passage portions branching from the first volume chamber and respectively connected to the cylinders, the second volume chamber being arranged to communicate the discrete passage portions with each other at a portion downstream of the first volume chamber and the common passage portion being directly communicated to only one of the first and second volume chambers; an on-off valve disposed at each junction of the second volume chamber with the discrete passage portions to move between an open position and a closed position in which an effective cross-sectional area of the junction is narrowed to an extent sufficient to prevent reflection of a pressure wave generated in the discrete passage portion at the second volume chamber, said junction being separate and spaced from said communicating means; and an actuator which moves the on-off valves to the open position as the engine speed increases at least during heavy load operation of the engine.

2. An intake system as defined in claim 1 in which said common passage portion is communicated with the second volume chamber.

3. An intake system as defined in claim 1 in which said common passage portion is communicated with the first volume chamber.

4. An intake system as defined in claim 1 in which said discrete passage portions have upstream end portions, and in which the upstream end portions of the discrete passage portions are formed along a periphery of the enlarged portion.

5. An intake system as defined in claim 4 in which a part of the enlarged portion forming the first volume chamber and an upper part of the upstream end portions of the discrete passage portions are formed integrally with each other into a unit, and the part of the enlarged portion forming the second volume chamber and a lower part of the upstream end portions of the discrete passage portions are formed integrally with each other into a unit.

6. An intake system as defined in claim 1 in which said cylinders are arranged in line, and the first and second volume chambers are elongated in shape in a direction parallel to the cylinder line, and the discrete passage portions extend substantially in perpendicular to the cylinder line.

7. An intake system as defined in claim 6 in which said first and second volume chambers have in common at least a part of a wall defining them.

8. An intake system as defined in claim 6 in which each discrete passage portion is communicated with the second volume chamber through a communicating means which is not smaller than the discrete passage portion in cross section.

9. An intake system as defined in claim 1 in which said first and second volume chambers are formed integrally with each other in an enlarged portion formed at an intermediate portion of the intake passage.

10. An intake system as defined in claim 9 in which the first and second volume chambers are formed by dividing an internal space of the enlarged portion by a partition wall.

11. An intake system as defined in claim 10 in which said communicating means comprises an opening formed in the partition wall.

12. An intake system as defined in claim 10 in which said communicating means comprises a passage having respective ends, said passage projecting outside the enlarged portion and communicated to the first and second volume chambers at the respective ends thereof.

* * * * *